United States Patent [19]

Heberger

[11] 4,214,035
[45] Jul. 22, 1980

[54] ANTISTATIC COATED POLYESTER FILM

[75] Inventor: John M. Heberger, Greenville, S.C.

[73] Assignee: American Hoechst Corporation, Somerville, N.J.

[21] Appl. No.: 8,012

[22] Filed: Jan. 31, 1979

Related U.S. Application Data

[63] Continuation-in-part of Ser. No. 1,328, Jan. 5, 1979, abandoned.

[51] Int. Cl.$^2$ .................. B32B 27/08; B32B 27/30; B32B 27/36
[52] U.S. Cl. ................................ 428/340; 427/40; 427/171; 427/172; 427/173; 427/209; 427/211; 427/428; 428/341; 428/483; 430/531; 430/633
[58] Field of Search ............... 428/340, 323, 483, 910, 428/341; 427/407 G, 40, 171, 172, 173, 209, 211, 428; 96/87 A

[56] References Cited

U.S. PATENT DOCUMENTS

| | | | |
|---|---|---|---|
| 3,264,136 | 8/1966 | Hedge | 428/327 |
| 4,074,000 | 2/1978 | Hankee | 428/325 |
| 4,089,997 | 5/1978 | Van Paesschen et al. | 427/172 X |

*Primary Examiner*—James C. Cannon
*Attorney, Agent, or Firm*—Michael J. Tully

[57] ABSTRACT

A polyester film coated with an antistatic coating is provided. The film includes a polyester film support coated on one side with a latex coating. The coating includes stearamidopropyldimethyl-$\beta$-hydroxyethylammonium nitrate present in a concentration in the range of between about 2.75 percent and 3.25 percent by weight, based on the total weight of the latex coating. The coating further includes a crosslinkable methylmethacrylate-ethylacrylate-methacrylamide terpolymer having a glass transition temperature in the range of between about 40° C. and 50° C. The terpolymer is present in a concentration in the range of between about 0.75 percent and 1.25 percent by weight, based on the total weight of the latex coating. The weight ratio of the nitrate to the terpolymer ranges between about 2.75:1 to below 3:1.

A process for forming the above film is also disclosed. In this process a latex coating of the composition described above is coated onto a uniaxially drawn polyester film support. The uniaxially drawn film is then heated to drive off the water and thereafter the uniaxially coated film is stretched in a direction normal to that of the uniaxial drawn film.

20 Claims, No Drawings

ANTISTATIC COATED POLYESTER FILM

This application is a continuation-in-part of Ser. No. 001,328, filed on Jan. 5, 1979, and now abandoned.

BACKGROUND OF THE DISCLOSURE

1. Field of the Invention

This invention is directed to an improved polyester film having excellent antistatic properties and the process for producing said film. More specifically, the instant invention is directed to a polyester film having improved antistatic properties in combination with improved slip properties and the process for producing the film. Still more specifically, the instant invention is directed to a polyethylene terephthalate film coated with a latex coating which imparts excellent antistatic and slip properties and the process for producing the film.

2. Summary of the Prior Art

The growth of microfilm and magnetic tape markets has significantly increased the utilization of polyester film as supports for these products. However, polyester film becomes electrostatically charged, especially at low relative humidity. This electrostatic charge attracts not only dust and other contaminants, but, additionally, attracts other polyester film supports. For instance, electrostatic forces interfere in the collating, sorting and developing of microfiche cards by causing the cards to stick together.

To overcome this serious problem, antistatic polyester films have been developed. Antistatic polyester films are usually formed by the application of an antistatic coating onto the surface of the polyester film. Many of these coatings have successfully reduced the electrostatic properties of the polyester film to satisfactorily low levels. However, many of these coatings cause blocking. That is, the polyester film coated with an antistatic layer has a coefficient of friction high enough so that one layer of the film does not slip over another or over rollers and other equipment over which the film moves during operation.

Another problem arising from the coating of an antistatic layer onto the surface of a polyester film is the decreased clarity resulting therefrom. This property, usually reported as haze, is very important in microfilm applications. Microfilm must be readable. Light is projected through the film so that the viewer may read the information printed on the film. Poor clarity results in fuzziness and difficulty in reading because of loss of light intensity.

The above discussion indicates the importance of polyester film having good antistatic properties, as well as good slip, or handleability, and clarity. Thus it is critical that the antistatic coating provide all three of these properties. Although the prior art includes disclosures directed to antistatic coating on polyester films none of them produce films having the combination of good antistatic, slip and clarity properties.

U.S. Pat. No. 4,089,997 issued to Van Paesschen et al includes a disclosure of stearamidopropyldimethyl-$\beta$-hydroxyethylammonium nitrate. However, the disclosure in U.S. Pat. No. 4,089,997 includes additional constituents, different from those in the instant invention, which do not produce the excellent combination of antistatic, slip and clarity properties.

Not only are the constituents present in the antistatic coating critical to the film's antistatic, slip and clarity properties, but moreover, the concentrations of these material are similarly of great importance, U.S. Pat. No. 3,264,136 issued to Hedge, discloses a coating which includes 0.2 percent by volume of stearamidopropyl-dimethyl-$\beta$-hydroxyethylammonium nitrate in combination with the additional constituents, polymethylmethacrylate. This combination of constituents did not produce the combination of antistatic, slip and clarity properties necessary for utilization in polyester film supported microfilm and magnetic tapes.

An additional requirement in antistatic film technology is not directed to the properties of the film. It is not enough that a latex coating provide the important properties discussed above. The latex coating must be stable. That is, the latex coating cannot precipitate out on standing, to form a two-phase system, for at least one week. This property, satisfactory pot life, is necessary for commercial operation of a coating process. One can ill afford to devise an antistatic coating providing excellent antistatic, slip and clarity properties which does not stay emulsified long enough to coat a suitable length of film.

SUMMARY OF THE INVENTION

The instant invention is directed to a polyester film support which not only has outstanding antistatic properties but also very good handleability, that is, good slip properties, as well as excellent clarity. These properties are provided by a latex coating which additionally has excellent pot life.

In accordance with the instant invention, a polyester film is provided. The film, which is biaxially oriented, is coated on one side with a latex coating. The latex coating includes stearamidopropyldimethyl-$\beta$-hydroxyethylammonium nitrate present in a concentration in the range of between about 2.75 and 3.25 percent by weight, based on the total weight of the latex coating. Additionally, the coating includes a crosslinked methylmethacrylate-ethylacrylate-methacrylamide terpolymer, having a glass transition temperature in the range of between about 40° C. and 50° C., present in a concentration in the range of between about 0.75 percent and 1.25 percent by weight, based on the total weight of the latex coating. The weight ratio of the two constituents in the latex coating, that is, the ratio of the nitrate to the terpolymer, is in the range of between about 2.75:1 and 3.25:1.

In accordance with the process for forming this film, a uniaxially drawn polyester film is coated with a latex coating, defined above. The uniaxially drawn polyester film is heated by exposure to elevated temperatures whereby the water in the latex coating is driven off. The dried latex coated uniaxially drawn film is then stretched, in a direction normal to that of the uniaxially drawn film, to form the antistatic, biaxially oriented polyester film.

DETAILED DESCRIPTION

Polyester film, upon which the antistatic layer is disposed, may be formed from any thermoplastic film forming polyester produced by condensing a dicarboxylic acid or a lower alkyl diester thereof with a glycol. Among the dicarboxylic acids or their lower alkyl diesters within the contemplation of this invention include terephthalic; isophthalic; phthalic; 2,5;2,6; or 2,7-naphthalene dicarboxylic; succinic; sebacic, adipic; azelaic, bibenzoic; and hexahydroterephthalic acids; and bis-p-carboxy phenoxy ethane. One or more of these dicarboxylic acids or their lower alkyl diesters is reacted with one or more glycols which include ethylene glycol; 1,3-propanediol; 1,4-butanediol; neopentyl glycol or 1,4-cyclohexanedimethanol. In that one or more diesters may be reacted with one or more glycols, the polyester film of this invention is not limited to homopolyesters but also includes copolyesters.

Of the film forming polyesters within the contemplation of this invention the most preferred is polyethylene terephthalate. Polyethylene terephthalate film is formed from a polymer produced by polymerization of bis(2-hydroxy ethyl) terephthalate. Bis(2-hydroxy ethyl) terephthalate is itself formed as an intermediate by one of two different methods. One method for producing bis(2-hydroxy ethyl) terephthalate is by direct esterification of terephthalic acid and ethylene glycol as described in U.S. Pat. No. 3,050,533. In this method the bi-product of the reaction is water which is distilled from the reaction product. A second method for producing bis(2-hydroxy ethyl) terephthalate is by transesterification of a dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. Preferably, the temperature is in the range of between about the boiling temperature of the reaction mixture to as high as 250° C. The reaction can occur at atmospheric, sub-atmospheric or super-atmospheric pressure. The bi-product of the transesterification reaction is an alkanol, for example, if dimethyl terephthalate is used, methanol is produced. The alkanol is removed from the reaction product. In order to increase the reaction rate, many known catalysts can be employed in the transesterification reaction.

After the bis(2-hydroxy ethyl) terephthalate has been produced it is converted to polyethylene terephthalate by heating at a temperature above the boiling point of the ethylene glycol or the reaction mixture under conditions effecting the removal of the glycol or water. The heating may occur at a temperature as high as 325° C., if desired. During heating, pressure is reduced so as to provide rapid distillation of the excess glycol or water. The final polyethylene terephthalate polymer has an intrinsic viscosity, as measured in orthochlorophenol at 25° C., in excess of 0.3 deciliter per gram. More preferably, the intrinsic viscosity of the polymer ranges from about 0.4 to about 1.0 deciliter per gram, again measured in orthochlorophenol at 25° C. Still more preferably, the polyethylene terephthalate of the instant invention has an intrinsic viscosity of about 0.5 to about 0.7 deciliter per gram as measured in orthochlorophenol at 25° C.

In a preferred embodiment of the process of the instant invention, the polyester film forming polymer is melted and thereafter extruded onto a polished revolving casting drum to form a cast sheet of the polymer. Thereafter, the film is biaxially stretched, that is, the film is stretched in the longitudinal and transverse direction. The first stretching step of the cast sheet may be in either of these two orthogonal directions. The amount of stretching, to impart strength and toughness to the film, can range from about 3.0 to about 5.0 times the original cast sheet dimension in both directions. Preferably, the amount of stretching is in the range of between about 3.2 and 4.2 times the original dimension. The stretching operations are carried out at temperatures in the range of from about the second order transition temperature to below the temperature at which the polymer softens and melts.

Where necessary, the film is heat treated, after stretching, for a period of time necessary to crystallize the polyester film. In the case of the preferred embodiment wherein polyethylene terephthalate is employed, crystallization imparts stability. When polyethylene terephthalate is heat treated, it is subjected to a temperature in the range of between about 190° C. and 240° C. and, more preferably, in the range of from about 215° C. and 235° C.

The latex coating, which imparts antistatic characteristics, good handleability, and good clarity to the film, is applied, in a preferred embodiment, after the film is uniaxially stretched, that is, after the film is stretched in one direction, but before the film is stretched in the orthogonal direction. In a more preferred embodiment, the polyester film is first stretched in the longitudinal direction, prior to coating. In this preferred embodiment, after longitudinal stretching, the film is coated by any of the well known techniques employed in the art. For example, coating may be effected by roller coating, spray coating, slot coating or immersion coating. In a preferred embodiment, the polyester film is coated with a latex coating by means of roller coating.

In a preferred embodiment the uniaxially drawn film is corona treated prior to coating. That is, the film is subjected to a corona discharge by a corona discharge apparatus prior to coating. The discharge treatment decreases the hydrophobic character of the polyester film surface. This permits the water based latex coating to more easily wet the surface and thus improve the adhesion of the coating to the surface.

The latex coating disposed on the polyester film is a latex dispersion of between about 2.75 percent and 3.25 percent by weight, based on the total weight of the latex coating, of stearamidopropyldimethyl-$\beta$-hydroxyethylammonium nitrate. In a more preferred embodiment, the concentration of this ammonium nitrate composition is in the range of between about 2.9 percent and 3.1 percent by weight, again based on the total weight of the latex coating. In a still more preferred embodiment, the concentration of the ammonium nitrate compound is about 3.0 percent by weight, based on the total weight of the latex coating.

The latex coating composition also includes a crosslinkable methylmethacrylate-ethylacrylate-methacrylamide terpolymer, present in a concentration in the range of between about 0.75 percent and 1.25 percent by weight, based on the total weight of the latex coating. The copolymer is further characterized by a glass transition temperature in the range of between about 40° C. and 50° C. More preferably, the terpolymer is present in a concentration in the range of between about 0.9 percent and 1.1 percent by weight, based on the total weight of the latex coating. In a still more preferred embodiment of the instant invention, the terpolymer is present in a concentration of 1.0 percent by weight, based on the total weight of the latex coating. The glass transition temperature of the terpolymer, in a more preferred embodiment, is in the range of between about 43° C. and 47° C., still more preferably, the glass transition temperature is about 45° C.

The two constituents of the latex coating are present in a weight ratio of between about 2.75:1 and 3.25:1, stearamidopropyldimethyl-β-hydroxy-ethylammonium nitrate to methylmethacrylate-ethylacrylate-methyacrylamide terpolymer. In a more preferred embodiment, the weight ratio of the nitrate to the terpolymer is in the range of between about 2.75:1 to 3.0:1.

After coating, but before stretching in a direction normal to the uniaxially drawn film, the film is dried by heating at a temperature of the range of between about 90° C. and 110° C. More preferably, the range is between 95° C. and 105° C.

In a preferred embodiment, the thickness of the coating, after drying, on the polyester film is at least 0.003 dry pounds of coating per thousand square feet of biaxially drawn film. More preferably, the dry coating weight is in the range of between about 0.003 pounds to 0.007 pounds per thousand square feet of coated film.

In another preferred embodiment, the antistatic coated film is coated on the opposite side with a crosslinkable acrylic polymeric coating. In a preferred embodiment, the acrylic polymeric coating is a crosslinkable ethyl acrylate-methyl methacrylate-methacrylamide terpolymer. The coating is crosslinked with an melamine formaldehyde. Preferably, the coating is applied by roller coating, to the uniaxially stretched polyester film. The coating is most preferably applied as a latex coating in which the solids comprise between about 3 to 4% by weight and the water constituent is between about 96% and 97% by weight of the latex coating.

This second side coating provides an anchor for acrylic and cellulosic lacquer coatings commonly employed in the reprographic industry.

The following examples are given to illustrate the invention. Nothing contained in the examples should, in any way, be interpreted as limiting the scope and spirit of the invention illustrated by these examples.

EXAMPLE 1

Polyethylene terephthalate polymer was melted and extruded through a slit die onto a casting drum maintained at a temperature of about 20° C. The melt froze to form a cast sheet. The cast sheet was longitudinally stretched at a draw ratio of approximately 3.6:1 while maintained at a temperature of about 80° C.

The longitudinally drawn film was corona treated by a corona discharge apparatus and thereinafter coated with a latex coating by reverse gravure coating.

The latex coating, coated onto the surface of the polyester film, included 3.0% by weight, based on the total weight of the coating composition, of stearamidopropyldimethyl-β-hydroxy-ethylammonium nitrate. The coating also included 1.0% by weight, based on the total weight of the coating composition, of methylmethacrylate-ethyl acrylate-methacrylamide terpolymer. The terpolymer is crosslinkable because of the presence of a melamine-formaldehyde crosslinking agent, hexamethoxymethylmelamine, and is characterized by a glass transition temperature of 45° C. The remaining constituent, water, represented 96% by weight of the latex coating. The coating is formed by mixing first the stearamidopropyldimethyl-β-hydroxy-ethylammonium nitrate to the water followed by the terpolymer. The solids are mixed together with the water by conventional mixing techniques to produce a uniform mixture which is the latex coating.

The corona treated, longitudinally drawn, coated film was dried at a temperature of about 100° C. Thereafter, the film was stretched, in the transverse direction, at a draw ratio of 3.6:1 to produce a biaxially drawn film. The biaxially drawn film was heat set at a temperature of 230° C. The final antistatic coating weight range was from 0.003 lb. to 0.007 lb. per 1000 square feet of biaxially drawn film. The total film thickness was approximately 3 mils (0.003 inch).

EXAMPLE 2

A comparison run was conducted in exactly the same manner as Example 1 to produce a 3 mil thick biaxially oriented polyethylene terephthalate, hereinafter referred to as PET, coated film except for the composition of the latex coating. In this example the coating comprised 1% by weight, based on the total weight of the coating composition, hereinafter referred to as "percent", stearamidopropyldimethyl-β-hydroxy-ethylammonium nitrate, hereinafter referred to as "nitrate"; 1% crosslinkable methyl methacrylate-ethyl acrylate-methacrylamide terpolymer having a glass transition temperature of 45° C., hereinafter referred to as "terpolymer"; and 98% water.

EXAMPLE 3

Another comparison run was conducted resulting in the formation of a coated film in exactly the same manner as Example 1 except that the latex coating comprised 3% nitrate, 3% terpolymer and 94% water.

EXAMPLE 4

Samples of the PET films formed in accordance with Examples 1–3 were tested for antistatic, coefficient of friction and haze properties. The antistatic property of the film was measured by a qualitative test. This test, the ash pickup test, includes the steps of cutting standard sized strips of coated film, rubbing the film six times over a cotton fabric and placing the rubbed side of the film one inch above a tray filled with cigarette ashes. Film having excellent antistatic properties will not cause any disturbance of the ashes. If the ashes in the tray are disturbed but are not drawn to the surface of the film, the film is categorized as "good". A film classified as "fair" causes the ashes to be disturbed and approach the surface of the film with slight sticking thereto. A film classified as "poor" is so rated because large quantities of the ash are attracted and held to the surface of the film. It is noted that the test is done a second time to the opposite side of the film. The final classification is the poorer of the two ratings if the two ratings are not the same.

The test for coefficient of friction (COF), the test to determine the slip property of the film, was made in accordance with a standard test, ASTM Method D 1894-68. All film samples tested in accordance with this test are preconditioned in accordance with ASTM Method D 618, Procedure A.

The dimensionless units of coefficient of friction are interpreted to indicate good slip (or handleability) if the COF ranges between 0.3 and 0.5. Below 0.2, slip is too great. Such films telescope, that is, the films are difficult to wind and are considered unsatisfactory. Above 0.5 slip is inadequate. Film having a COF in excess of 0.5 is prone to blocking. When a film blocks, it does not slip at all over the surface to which it is in contact.

The test for haze, the best indication of the clarity of the film, is determied by ASTM Test Method D 1003-61 Procedure A Section 7.

Haze (for 3 mil thick PET film) of 1.2% or below is considered to be acceptable. Of course, the lower the percent haze, the clearer the film. A haze of more than 1.2% is unacceptable.

In addition the latex coatings were rated as stable or unstable. A stable latex coating is one which remains an emulsion for at least one week. An unstable latex coating is one which breaks down into a two-phase system.

Unfortunately, it was found that PET polymer employed in Examples 1-3 was contaminated making meaningless the haze and coefficient of friction data.

The tests for films made in accordance with Examples 1-3 are summarized in Table I.

TABLE I

| Example Number | Haze % | COF Static | Kinetic | Ash Pickup At 50% RH | At ( ) RH | Latex Stability |
|---|---|---|---|---|---|---|
| 1 | 2.5 | C/C .21 | .23 | Good | Excellent(40%) | Stable |
|  |  | C/U .23 | .27 |  |  |  |
| 2 | 2.5 | C/C .33 | .35 | Good | Excellent(45%) | Stable |
|  |  | C/U .36 | .37 |  |  |  |
| 3 | 2.3 | C/C .65 | .43 | Good | Poor (42%) | Stable |
|  |  | C/U .87 | .45 |  |  |  |

NOTE 1:
C = Antistatic Coated Side
U = Uncoated Side
NOTE 2:
Example number in this and future tables represents film formed in accordance with example number in this specification.
NOTE 3:
Parenthesized percentage indicates the percent relative humidity at which the ash pickup test was run.

The above results indicate that the film formed in accordance with this invention, Example 1, demonstrated good antistatic properties and good latex stability. Example 3, the film coated with 3% terpolymer had unsatisfactory antistatic properties. In this respect, it is noted that whereas the ash pickup test at 50% relative humidity is good, the test at a lower relative humidity, 42%, indicated the unacceptability of this coating. The lower the relative humidity, the more pronounced is the static propensity of polyester film and the more rigorous the test of the effectiveness of the antistatic coating. It is noted that all relative humidity measurements were taken at temperatures in the range of between 72° F. and 74° F.

As indicated above, the haze and coefficient of friction tests were meaningless due to the contamination of the polymer.

EXAMPLE 5

Example 1 was repeated except that the side opposite the antistatic coated film side was coated with a latex coating comprising a 3% methyl methacrylate-ethyl acrylate-methacrylamide terpolymer crosslinked with hexamethoxymethylmelamine and 97% water. The coating was applied by reverse gravure roll to the longitudinally drawn PET film and dried simultaneously with, and in the same manner as the antistatic coating on the other side. The resultant product was a biaxially drawn 3 mils thick PET film coated on one side with the antistatic coating described in Example 1 and on the other with the crosslinked acrylic coating described above. The dry weight of the crosslinked acrylic coating ranged between about 0.003 pound and 0.007 pound per 1000 square feet of biaxially stretched film.

EXAMPLES 6-7

Two comparison runs, conducted in the same manner as Example 5 except that the antistatic coating was applied from different latex coatings. In Example 6, the latex coating included 2% nitrate, 1% terpolymer and 97% water. In Example 7 the latex coating included 3% nitrate, 2% terpolymer and 95% water. The resultant films were two side coated films differing from the film found in accordance with Example 5 only by the difference in the concentration of the constituents of the antistatic coating.

EXAMPLE 8

The films made in accordance with Examples 5-7 were tested for antistatic, slip and clarity properties, using the same tests as were employed in Example 4. The test results are summarized below in Table II.

TABLE II

| Example Number | Haze, % | COF Static | Kinetic | Ash Pickup At 50% RH | At 41% RH | Latex Stability |
|---|---|---|---|---|---|---|
| 5 | 1.2 | A/A .43 | .44 |  |  |  |
|  |  | B/B .23 | .25 | Good | Good | Good |
|  |  | A/B .29 | .32 |  |  |  |
| 6 | Not measured | Not measured |  | Fair | Poor | Good |
| 7 | 1.2 | A/A .48 | .48 |  |  |  |
|  |  | B/B .23 | .27 | Good | Good | Poor |

TABLE II-continued

| Example | | COF | | Ash Pickup | | Latex |
| Number | Haze, % | Static | Kinetic | At 50% RH | At 41% RH | Stability |
|---|---|---|---|---|---|---|
| | | A/B .31 | .35 | | | |

NOTE:
A = Acrylic Coated Side
B = Antistatic Coated Side

It is noted that the film made in accordance with the instant invention was acceptable in all respects. The results of these tests are tabulated in Table III, which appears below:

TABLE III

| Example Number | Haze % | COF Static | Kinetic | Ash Pickup at 36.5% | at 50% RH | Surface Resist. Ohms | Latex Stability |
|---|---|---|---|---|---|---|---|
| 9 | .94 | A/A .45 | .48 | | | | |
| | | B/B .36 | .40 | Exc. | Exc. | 4.7 × 10$^{10}$ | Not tested |
| | | A/B .31 | .42 | | | | |
| 10 | 1.04 | A/A .47 | .47 | | | | |
| | | B/B .29 | .31 | Poor | Exc. | 1.2 × 10$^{11}$ | Good |
| | | A/B .32 | .33 | | | | |
| 11 | 1.10 | A/A .48 | .48 | | | | |
| | | B/B Block | Block | Exc. | Good | 4.2 × 10$^{10}$ | Good |
| | | A/B .38 | .71 | | | | |

NOTE 1:
A = Acrylic Coated Side
B = Antistatic Coated Side
NOTE 2:
The latex coating employed in Example 9 was lost and thus not tested.
NOTE 3:
All ash pickup runs were conducted at a temperature of 74° F.
NOTE 4:
Surface resistivity was measured in a room having a temperature of 78° F. and 32–36% RH.
NOTE 5:
Surface resistivity reported is the average of two readings measured on the antistatic coated side.

film made in Example 6, which had a level of nitrate outside the scope of the invention, exhibited unacceptable antistatic properties. This film was not measured for clarity or slip. The film made in accordance with Example 7 was acceptable in all respects except that the latex coating did not remain stable for one week.

EXAMPLE 9

A 3 mil biaxially oriented PET film was made in exact accordance with the procedure and coatings employed in Example 5. That is, the antistatic latex coating included 3% nitrate, 1% terpolymer and 96% water.

EXAMPLES 10-11

Two additional comparisons were run in exact conformance with the procedure employed in Example 9 except for the composition of the antistatic latex coating. The film made in accordance with Example 10 comprised 3% nitrate and 2% terpolymer (as in Example 7). The film made in accordance with Example 11 included 4% nitrate and 1% terpolymer.

EXAMPLE 12

The films made in accordance with Examples 9–11 were tested in accordance with the procedures discussed in Example 4.

In addition, a more quantitative test to determine the film's antistatic property was employed. This test is the measurement of the surface resistivity of the film. The procedure employed for measuring this value is set out in ASTM Test D257-66.

A surface resistivity of 10$^{10}$ ohms or less represents a film having a good antistatic property. A surface resistivity greater than 10$^{11}$ ohms is considered unacceptable.

The above results confirm the excellent results obtained in the test of the film made in Example 9, within the scope of this invention. The comparison film, made in accordance with Example 10, had unacceptable antistatic characteristics. The ash pickup at 36.5% relative humidity was unacceptable on the acrylic coated side. It is noted that the surface resistivity data confirms the conclusion drawn from the ash pickup test. In conformance, it is noted that ash pickup, at 36.5% RH, was rated good on the antistatic coated side. As indicated above the classification reported is the lower of the two ratings for the two sides of the film.

The film made in accordance with Example 11 was unacceptable based on its unacceptable slip properties.

EXAMPLES 13-15

A set of experiments were run to determine the effect of a coating similar to that disclosed in U.S. Pat. No. 3,264,136. In that patent an example is given of a PET film coated with a coating dispersion including 0.14% by weight of polymethyl methacrylate and 0.2% by volume of stearamidopropyl-dimethyl-β-hydroxyethyl ammonium nitrate, the same component used in the instant invention and denoted in the Examples as "nitrate". A volume concentration of 0.2% is roughly equivalent to a weight concentration of between 0.2 and 0.3% since the specific gravity of the nitrate is close to 1.

To determine the effectiveness of the above composition, Example 13 was run in conformance with the procedure enumerated in Example 1.

At the same time, another latex coating including 0.5% by weight of polymethyl methacrylate, based on the total weight of the composition, and 0.5% nitrate was employed in the formation of a biaxially oriented, coated 3 mil PET film. This run, Example 14 differed from Example 13 only to the extent that a different coating was employed.

A third coating composition was employed to produce a third PET film. This film was processed in accordance with the same procedure employed in Examples 13 and 14 except that the latex coating comprised 1% polymethyl methacrylate, 3% nitrate and 96% water. The experiment resulting in the production of this PET film is denoted as Example 15.

EXAMPLE 16

The films formed in accordance with Examples 13–15 were tested for antistatic, slip and haze properties as well as latex stability. The results of these tests are summarized in Table IV.

TABLE IV

| Example Number | Haze % | COF Static | Kinetic | Ash Pickup at 40% RH, 78–79°F. | Latex Stability |
|---|---|---|---|---|---|
| 13 | .94 | C/C .73 | .58 | | |
|  |  | C/U Blocked | Blocked | Good | Good |
| 14 | .74 | C/C .37 | .40 | | |
|  |  | C/U .34 | .39 | Poor | Poor |
| 15 | 1.62 | C/C .28 | .82 | Good | Poor |
|  |  | C/U .24 | .45 | | |

NOTE:
C = Antistatic Coated Side
U = Uncoated Side

The tabulated results above yield one anomalous result. For unknown reasons the film of Example 13 had unacceptable slip properties. In all other respects the film and the latex stability of the coating used to coat that film was acceptable.

Example 14 illustrates the unacceptability of a latex coating having as little as 0.5% by weight nitrate, even if polymethyl methacrylate is used as the second component. As indicated by the ash pickup test, the antistatic properties of this coating, employing even a higher concentration of nitrate than suggested by U.S. Pat. No. 3,264,136, is unacceptable. This also in spite of the fact that the polymethylmethacrylate is similarly increased in concentration closer to the range employed by the terpolymer of the instant invention.

Example 15 illustrates the unacceptability of employing polymethylmethacrylate instead of the terpolymer. The clarity of this film is unacceptable. It is noted that but for the substitution of polymethylmethacrylate for the terpolymer this film would be within the scope of this invention.

It is also emphasized that the latex coating employing polymethylmethacrylate is unacceptable because of the unstability of the coating. The latex coatings in Example 14 (0.5% polymethylmethacrylate) and Example 15 (1.0% polymethylmethacrylate) both coagulated before one week.

EXAMPLES 17–22

Six experiments were run to determine the effect of the weight ratio of nitrate to terpolymer. This was accomplished by producing biaxially stretched PET film in accordance with the procedure enumerated in Example 1 except for the composition of the antistatic latex coating composition. The composition of the coating, in every case, included 1% by weight of the terpolymer. The six runs varied in the concentration of the nitrate. Example 17 included 2.00% nitrate by weight and in each succeeding example the nitrate concentration was increased by 0.25% so that Example 23 included 3.25% nitrate. Thus, the ratio of nitrate to terpolymer varied from 2.00 in Example 17 to 3.25 in Example 23. It is emphasized that the side opposite the antistatic coated side remained uncoated.

EXAMPLE 23

The samples formed in accordance with Examples 17–23 were tested to determine antistatic, slip and clarity properties of the one side coated 3 mil thick biaxially oriented PET. In all cases the haze values of all the films were acceptable.

The ash pickup test of all the samples run at 37% relative humidity and 78° F.–79° F. tested as good. Furthermore, the latex stability for all coating samples employed in this test was satisfactory. The remaining results, which included a repeat of the ash pickup test at a lower relative humidity, appear below in Table V.

TABLE V

| Example Number | Ratio (Nitrate/Terpolymer) | Ash Pickup | At %RH | COF Static | Kinetic |
|---|---|---|---|---|---|
| 17 | 2.00 | Poor | 31.5 | C/C .30 | .26 |
|  |  |  |  | C/U .33 | .42 |
| 18 | 2.25 | Poor | 31.5 | C/C .25 | .27 |
|  |  |  |  | C/U .33 | .44 |
| 19 | 2.50 | Good | 31.5 | C/C .27 | .32 |
|  |  | Poor | 31.0 | C/U .35 | .44 |
| 20 | 2.75 | Good | 31.5 | C/C .31 | .37 |
|  |  | Good | 31.0 | C/U .33 | 1.24 |
| 21 | 3.00 | Good | 31.5 | C/C .37 | .48 |
|  |  | Good | 31.0 | C/U .30 | .80 |
| 22 | 3.25 | Good | 31.5 | C/C Blocked | Blocked |
|  |  | Good | 31.0 | C/U Blocked | Blocked |

NOTE 1:
Ash pickup was measured at a temperature of 76° F.
NOTE 2:
C = Antistatic Coated Side
U = Uncoated Side At 31.0–31.5% relative humidity the ash pickup test results indicative of the antistatic properties of the film, indicated that acceptable results were obtained when the nitrate terpolymer ratio was between 2.75 and 3.25. At lower ratios unacceptable antistatic properties were obtained.

The slip properties of all the films formed in Examples 17–22 were acceptable overall, except for Example 22. This anomalous result cannot be explained except to indicate that it is at the upper end of the acceptable range.

EXAMPLES 24–29

The test described in Examples 17–23 was repeated in accordance with the procedure of Example 4 with one small variation. That is, the test of Examples 17–23 was repeated for the case where the side opposite to the antistatic coated side is coated with the crosslinked acrylic coating described in Example 4. However, the coating concentration of the crosslinkable acrylic coating was 3.2% by weight, based on the total weight of the coating latex composition.

EXAMPLE 30

The films found in accordance with the Examples 24–29 were tested for the properties tested in Example 23.

In all examples acceptable haze values were obtained. In addition, the latex stability was rated good. As in Examples 17–23, ash pickup at 37% relative humidity and 78° F. was acceptable in all cases. However, at 31.0% relative humidity, predictable results were obtained. These results are summarized in Table VI.

TABLE VI

| Example Number | Weight Ratio Nitrate/Terpolymer | Ash Pickup | COF Static | Kinetic |
|---|---|---|---|---|
| 24 | 2.00 | Poor | A/A .41 | .43 |
|    |      |      | B/B .24 | .28 |
|    |      |      | A/B .33 | .38 |
| 25 | 2.25 | Poor | A/A .41 | .41 |
|    |      |      | B/B .27 | .31 |
|    |      |      | A/B .27 | .33 |
| 26 | 2.50 | Poor | A/A .45 | .47 |
|    |      |      | B/B .29 | .33 |
|    |      |      | A/B .28 | .46 |
| 27 | 2.75 | Good | A/A .43 | .44 |
|    |      |      | B/B .30 | .38 |
|    |      |      | A/B .30 | .40 |
| 28 | 3.00 | Good | A/A .43 | .48 |
|    |      |      | B/B .41 | .46 |
|    |      |      | A/B .26 | .64 |
| 29 | 3.25 | Good | A/A .44 | .48 |
|    |      |      | B/B .68 | .78 |
|    |      |      | A/B .32 | .86 |

NOTE 1:
Ash pickup was run at 31.0% relative humidity and 76° F.
NOTE 2:
In all cases the terpolymer concentration, in the antistatic latex employed in calculating the weight ratio was 1% by weight.
NOTE 3:
A = Acrylic Coated Side
B = Antistatic Coated Side The above results are in accordance with those obtained in Example 23 insofar as the ash pickup antistatic characteristics are concerned. The slip properties of all the samples were acceptable including the sample made in accordance with Example 29 at the weight ratio of 3.25, although this film was deemed just barely acceptable.

The above embodiments and examples illustrate the scope of the instant invention. Other embodiments and examples within the scope of the instant invention are within the contemplation of this invention. Therefore, the scope of this invention should be limited only by the scope of the appended claims.

What is claimed is:

1. A biaxially oriented polyester film comprising a polyester film support coated on one side with a latex coating, said coating including:
   stearamidopropyldimethyl-$\beta$-hydroxy-ethylammonium nitrate, present in a concentration in the range of between 2.75% and 3.25% by weight, based on the total weight of the latex coating; and
   a crosslinkable methylmethacrylate-ethyl acrylate-methacrylamide terpolymer, having a glass transition temperature in the range of between about 40° C. and 50° C., present in a concentration in the range of between about 0.75% and 1.25% by weight based on the total weight of the latex coating wherein the weight ratio of said stearamidopropyldimethyl-$\beta$-hydroxy-ethylammonium nitrate to said crosslinkable methylmethacrylate-ethyl acrylate-methacrylamide terpolymer is in the range of between about 2.75:1 and 3.25:1.

2. A biaxially oriented polyester film in accordance with claim 1 wherein the total dry coating weight of said coating on said polyester film is at least 0.003 pound per 1000 square feet of biaxially oriented film.

3. A polyester film in accordance with claim 2 wherein said total dry coating weight is in the range of between about 0.003 and 0.007 pound per 1000 square feet of biaxially stretched film.

4. A film in accordance with claim 1 wherein the weight ratio of said stearamidopropyldimethyl-$\beta$-hydroxy-ethylammonium nitrate to said crosslinkable methylmethacrylate-ethyl acrylate-methacrylamide terpolymer is in the range of between about 2.75:1 and 3.0:1.

5. A film in accordance with claim 1 wherein said polyester is polyethylene terephthalate.

6. A film in accordance with claim 1 wherein said stearamidopropyldimethyl-$\beta$-hydroxy-ethylammonium nitrate is present in said latex coating in a concentration in the range of between about 2.9% and 3.1% by weight, based on the total weight of said latex coating.

7. A film in accordance with claim 6 wherein said stearamidopropyldimethyl-$\beta$-hydroxy-ethylammonium nitrate is present in said latex coating in a concentration in the range of between about 3.0% by weight, based on the total weight of said latex coating.

8. A film in accordance with claim 1 wherein said crosslinkable methylmethacrylate-ethyl acrylate-methacrylamide terpolymer is present in said latex coating in a concentration in the range of between about 0.9% and 1.1% by weight based on the total weight of said latex coating.

9. A film in accordance with claim 8 wherein said crosslinkable methylmethacrylate-ethyl acrylate-methacrylamide terpolymer is present in said latex coating in a concentration in the range of about 1.0% by weight, based on the total weight of said latex coating.

10. A film in accordance with claim 1 wherein said crosslinkable methylmethacrylate-ethylacrylate-methacrylamide terpolymer has a glass transition temperature of between about 43° C. and 47° C.

11. A film in accordance with claim 10 wherein said crosslinkable methylmethacrylate-ethylacrylate-methacrylamide terpolymer has a glass transition temperature of 45° C.

12. A film in accordance with claim 1 wherein opposite said latex coating is coated with a second latex coating, said second latex coating comprising a crosslinkable methylmethacrylate-ethylacrylate-methacrylamide terpolymer having a glass transition temperature in the range of between about 40° C. and 50° C., and present in a concentration of between about 3.0% and 4.0% by weight, based on the total weight of said second latex coating.

13. A process for forming an antistatic biaxially oriented polyester film comprising the steps of:
applying a latex coating, said coating comprising stearamidopropyldimethyl-$\beta$-hydroxy-ethylammonium nitrate, present in a concentration in the range of between about 2.75% and 3.25% by weight, based on the total weight of said latex coating, and a crosslinkable methylmethacrylate-ethylacrylate-methacrylamide terpolymer having a glass transition temperature in the range of between about 40° C. and 50° C. and present in a concentration in the range of between about 0.75% and 1.25% by weight based on the total weight of the latex coating wherein the weight ratio of said nitrate to said terpolymer is in the range of between about 2.75:1 and 3.25:1, to a uniaxially drawn polyester film;
heating said coated, uniaxially drawn film at a temperature in the range of between about 90° C. and 110° C. wherein said coating is dried;
stretching said coated uniaxially drawn film in a direction normal to the direction of the uniaxially drawn film wherein biaxially drawn film is produced.

14. A process in accordance with claim 13 wherein said polyester is polyethylene terephthalate.

15. A process in accordance with claim 14 wherein said biaxially drawn film is heat set at a temperature in the range of between about 190° C. and 240° C.

16. A process in accordance with claim 13 wherein said coating of said uniaxially drawn film is applied by roller coating.

17. A process in accordance with claim 16 wherein said uniaxially drawn film is applied by reverse gravure coating.

18. A process in accordance with claim 13 wherein said uniaxially drawn film coated with said latex coating is longitudinally drawn film.

19. A process in accordance with claim 13 wherein said uniaxially drawn film is coated with a second coating on the side opposite said first coated side, said second coating comprising a latex coating including a crosslinkable methylmethacrylate-ethyl acrylate-methacrylamide terpolymer having a glass transition temperature in the range of between about 40° C. and 50° C., present in a concentration in the range of between 3.0% and 4.0% by weight, based on the total weight of said second latex coating.

20. A process in accordance with claim 13 wherein said uniaxially drawn film is subjected to a corona discharge prior to the coating of said film.

* * * * *